United States Patent [19]

Imao et al.

[11] Patent Number: 5,541,742
[45] Date of Patent: *Jul. 30, 1996

[54] COLOR CORRECTION SYSTEM FOR TRANSFORMING COLOR IMAGE FROM ONE COLOR SPACE TO ANOTHER

[75] Inventors: Kaoru Imao, Yokohama; Satoshi Ohuchi, Tokyo; Takashi Saitoh; Shin Aoki, both of Yokohama, all of Japan

[73] Assignee: Ricoh Company, Ltd., Tokyo, Japan

[*] Notice: The term of this patent shall not extend beyond the expiration date of Pat. No. 5,436,739.

[21] Appl. No.: 450,131

[22] Filed: May 25, 1995

Related U.S. Application Data

[63] Continuation of Ser. No. 984,646, Dec. 2, 1992, Pat. No. 5,436,739.

[30] Foreign Application Priority Data

Dec. 3, 1991 [JP] Japan .................. 3-348006
Jul. 17, 1992 [JP] Japan .................. 4-190423
Sep. 24, 1992 [JP] Japan .................. 4-254275

[51] Int. Cl.$^6$ .................. H04N 1/54; H04N 1/60
[52] U.S. Cl. .................. 358/518; 358/519; 358/520; 358/523; 358/525
[58] Field of Search .................. 358/518, 520, 358/523, 525; 382/167, 162

[56] References Cited

U.S. PATENT DOCUMENTS 4,887,150 12/1989 Chiba et al. .................. 358/523

5,311,332 5/1994 Imao et al. .................. 358/518

FOREIGN PATENT DOCUMENTS 64-47174 2/1989 Japan .

*Primary Examiner*—Scott A. Rogers
*Attorney, Agent, or Firm*—Woodcock Washburn Kurtz Mackiewicz & Norris

[57] ABSTRACT

A color correction apparatus includes a preprocessor for generating a minimum value signal, a set of difference signals, and a selecting signal in accordance with values of input XYZ color data, the minimum value signal indicating a minimum value among the input XYZ color values, the difference signals indicating differences between the minimum value and the remaining values of the input XYZ color data, and the selecting signal being used to select one of unit triangular prisms in XYZ color space, a first part for computing a first signal of output color data through interpolation being performed, using predetermined values of output colors corresponding to lattice points of the selected unit triangular prism, in accordance with a value of the minimum value signal and in accordance with values of the difference signals, a second part for computing a second signal of the output color data in accordance with the value of the minimum value signal, and a third part for generating a third signal indicating the output color data by adding the first signal and the second signal.

5 Claims, 10 Drawing Sheets

$T_1 \sim T_3$ : LATTICE POINTS

BEFORE COMPRESSION

AFTER COMPRESSION

θ : HUE
d : CHROMATICITY

TYPE 0

TYPE 1

TYPE 2

COLOR CORRECTION SYSTEM FOR TRANSFORMING COLOR IMAGE FROM ONE COLOR SPACE TO ANOTHER

This is a continuation of U.S. patent application Ser. No. 07/984,646, filed Dec. 2, 1992, now U.S. Pat. No. 5,436,739.

BACKGROUND OF THE INVENTION

The present invention generally relates to transformation of a color image from one color space to another, and more particularly to a color correction system for transforming the intensities of input RGB data of a color scanner into the densities of output YMC colors for a color printer or display. The color correction system is applicable to image forming systems such as a color facsimile machine and a color copying machine.

Conventionally, there have been proposed color correction methods for transforming the intensities of input RGB data of red (R), green (G) and blue (B), into the densities of output YMC colors of yellow (Y), magenta (M) and cyan (C). The input RGB data is generated from an original image by a color scanner, and the input RGB data is input to a color correction circuit of an image forming system. In the image forming apparatus, the color correction circuit generates the output YMC signals from the input RGB signals through color transformation, and, the quantity of ink of each of yellow, magenta and cyan colors used in printing a color image by a color printer is controlled in accordance with the output YMC signals of the color correction circuit.

Among the above mentioned color correction methods, there are a linear masking method, a nonlinear masking method, and a memory mapping method. In the linear masking method, color correction is performed to eliminate only linear distortions from the image. The nonlinear masking method is to eliminate linear and nonlinear distortions from the image. In the memory mapping method, the transformation of a color image is performed using a memory in which combinations of output YMC values corresponding to each of combinations of input RGB values are stored.

In the case of the linear masking, the implementation to hardware is easy, but it is difficult to produce accurate output YMC color signals. In the case of the nonlinear masking, highly accurate color signals can be produced as outputs, but many multipliers are required in the color correction circuit, and the hardware size becomes large. Generally, when either the linear masking method or the nonlinear masking method is used, it is difficult to accomplish flexible color modification necessary for a color copier machine to output a color image with the desired image quality.

When the memory mapping method is used, accurate color correction and flexible color modification can be achieved. However, the implementation to hardware is difficult because the memory of the color correction system requires a large capacity to store all the combinations of densities of output YMC colors corresponding to each combination of intensities of input RGB data.

Moreover, there has been proposed a color correction circuit that is relevant to the above mentioned color correction methods. In this color correction circuit, when a conventional UCR process is performed in the color correction, the output YMC color signals are produced through matrix computation with a matrix of color difference values between the minimum signal (black) and the input color signals.

It is desirable to produce output YMC colors for the achromatic area of YMC color space with high accuracy of color reproduction. However, generally, it is difficult to make color differences between the original image and the reproduced image for the achromatic (black-and-white) area negligible. In order to achieve a highly accurate color reproduction for the black-and-white area, there has been proposed an improved color transformation method. For example, Japanese Laid-Open Patent Publication No. 64-47174 discloses such a color transformation method.

In the color transformation method disclosed in the above mentioned publication, the input RGB values are separated into color components and black-and-white components, and the color transformation to produce output YMC colors is performed separately for each of the two components, so as to achieve accurate color reproduction for the black-and-white areas of the image. However, in this conventional method, it is necessary that different sets of coefficients be used to perform matrix computations for each of divided color areas. For this reason, relatively large gaps of the color densities appear between the different color areas, and the continuity of change of the color densities is lost. Therefore, due to the use of different coefficients of the matrix computation for different color areas, the above color transformation method has a problem in that the quality of the reproduced image becomes poor.

SUMMARY OF THE INVENTION

Accordingly, it is a general object of the present invention to provide an improved color correction system in which the above described problems are eliminated.

Another, more specific object of the present invention is to provide a color correction system that can achieve accurate color reproduction for the black-and-white areas of input color data through the color transformation so that output YMC colors are produced with high accuracy. Still another object of the present invention is to provide a color correction system in which a single color transforming circuit can independently manipulate lightness, chromaticity and hue of an output image while the color transformation is performed so as to produce the output YMC colors from the input RGB data.

The above mentioned objects of the present invention can be achieved by a color correction apparatus that includes a preprocessor for generating a minimum value signal, a set of difference signals, and a selecting signal in accordance with values of input XYZ color data, the minimum value signal indicating a minimum value among the input XYZ color values, the difference signals indicating differences between the minimum value and the remaining values of the input XYZ color data, and the selecting signal being used to select one of unit triangular prisms in XYZ color space, a first part for computing a first signal of output color data through interpolation which interpolation is performed, using predetermined values of output colors corresponding to lattice points of the unit triangular prism selected by the selecting signal, in accordance with a value of the minimum value signal and in accordance with values of the difference signals, a second part for computing a second signal of the output color data in accordance with the value of the minimum value signal, and a third part for generating a third signal indicating the output color data by adding the first signal and the second signal. According to the present invention, it is possible to achieve highly accurate color reproduction for the achromatic area of input color data through the color transformation. According to the present invention, it is also possible to independently manipulate lightness, chromaticity and hue of an output image while the color transformation is performed.

Other objects and further features of the present invention will become apparent from the following detailed description when read in conjunction with the accompanying drawings.

DESCRIPTION OF THE PREFERRED EMBODIMENTS

Figure 1:
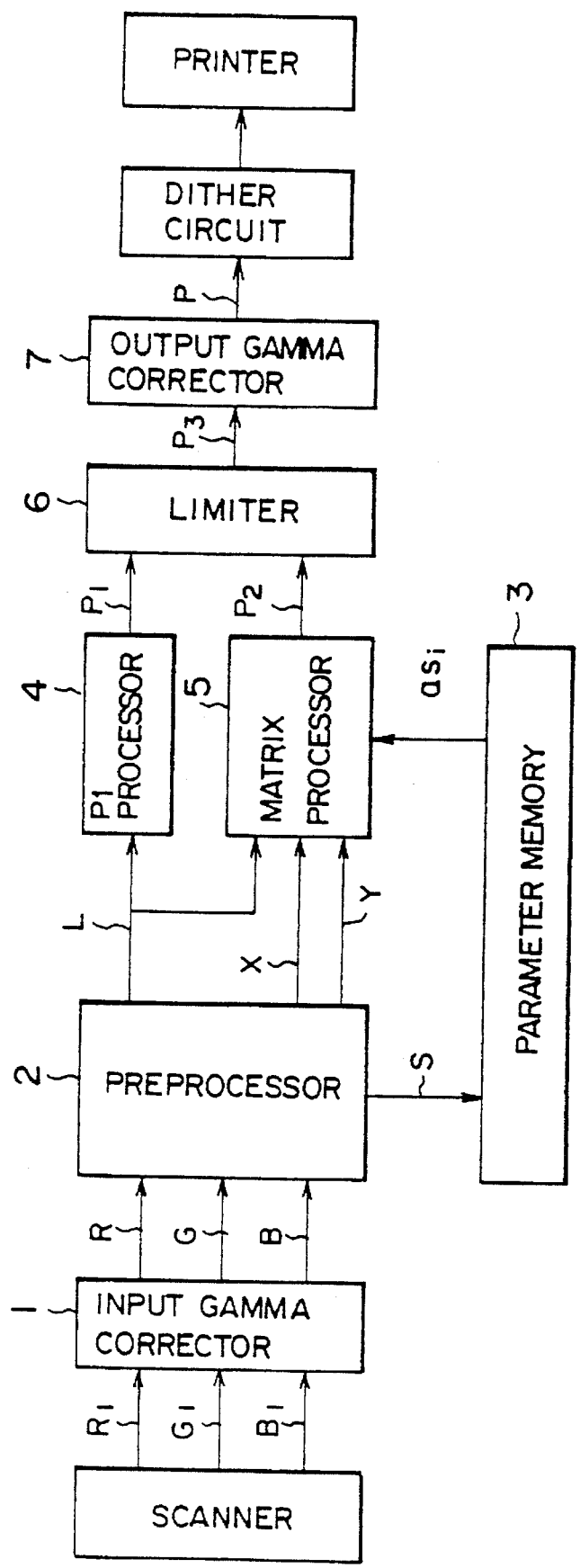
FIG. 1 is a block diagram showing a first embodiment of a color correction apparatus according to the present invention.

A description will now be given of a first embodiment of a color correction apparatus according to the present invention, with reference to FIG. 1. In the color correction apparatus shown in FIG. 1, there are provided an input gamma corrector 1, a preprocessor 2, a parameter memory 3, a P1 processor 4, a matrix processor 5, a limiter 6, and an output gamma corrector 7. The input gamma corrector 1 performs gamma correction for eliminating the nonlinearity of image data (R1, G1, B1) of a color scanner, so as to produce RGB data (R, G, B) as inputs for the preprocessor 2.

The preprocessor 2 generates a signal of the minimum value L among the input RGB data (R, G, B) by comparing the values of the input RGB data. The preprocessor 2 also generates difference data (X, Y) indicating differences between the other input RGB data and the minimum value L. The preprocessor 2 also generates a selecting signal S used to select an area of color space LXY in accordance with the values of the input RGB data. The selecting signal S of the preprocessor 2 is output to the parameter memory 3 as address input.

In the parameter memory 3, sets of predetermined parameters (asi) for the color transformation are stored at addresses corresponding to the signal S from the preprocessor 2. Therefore, by means of the parameter memory 3, it is possible to select an appropriate area of the color space LXY in accordance with the signal S from the preprocessor 2.

In accordance with the minimum value L from the preprocessor 2, the P1 processor 4 generates a signal of output data P1 corresponding to achromatic components of the input data. Since a set of predetermined parameters (asi) at an address indicated by the selecting signal S is supplied to the matrix processor 5, the matrix processor 5 produces a signal of output data P2 in accordance with the minimum value L and the difference data X and Y. The output data P2 is produced through prescribed interpolation with the unit triangular prism on the color space, and the output data P2 is determined based on the minimum value L and the difference data X and Y.

The output data P1 of the P1 processor 4 and the output data P2 of the matrix processor 5 are added at the limiter 6 to produce a signal of output data P3 (=P1+P2). The limiter 6 performs a limiting process for the output data P3. The output gamma corrector 7 produces a signal P indicating the output YMC data, by performing gamma correction for the signal P3 of the limiter 6.

The signal P from the output gamma corrector 7 is supplied to the dither circuit, so that a dither process for the output signal is performed for gradation rendering of the output image. The signal P from the dither circuit is supplied to a color printer so that the quantity of ink of each of yellow, magenta and cyan colors used by the color printer is controlled in accordance with the signal P from the dither circuit.

A more detailed description will be given below of the first embodiment of the present invention. The image data (R1, G1, B1) of the color scanner varies linearly with the reflection factor, and the input gamma corrector 1 performs the gamma correction for the signal of the image data (R1, G1, B1) using a lookup table, so as to output the RGB data (R, G, B) to the preprocessor 2. When the input data (R1, G1, B1) of the scanner is achromatic data, the RGB data (R=G=B) is output to the preprocessor 2.

By comparing the values of the RGB data with each other, the preprocessor 2 generates a signal of the minimum value L among the input RGB data (R, G, B), and it also generates signals of difference data (X, Y) indicating differences between the minimum value L and the other input RGB data. The preprocessor 2 also generates the selecting signal S to select an area of the color space LXY in accordance with the values of the input RGB data. The signal S of the preprocessor 2 is supplied to the parameter memory 3 as address input.

Figure 2:
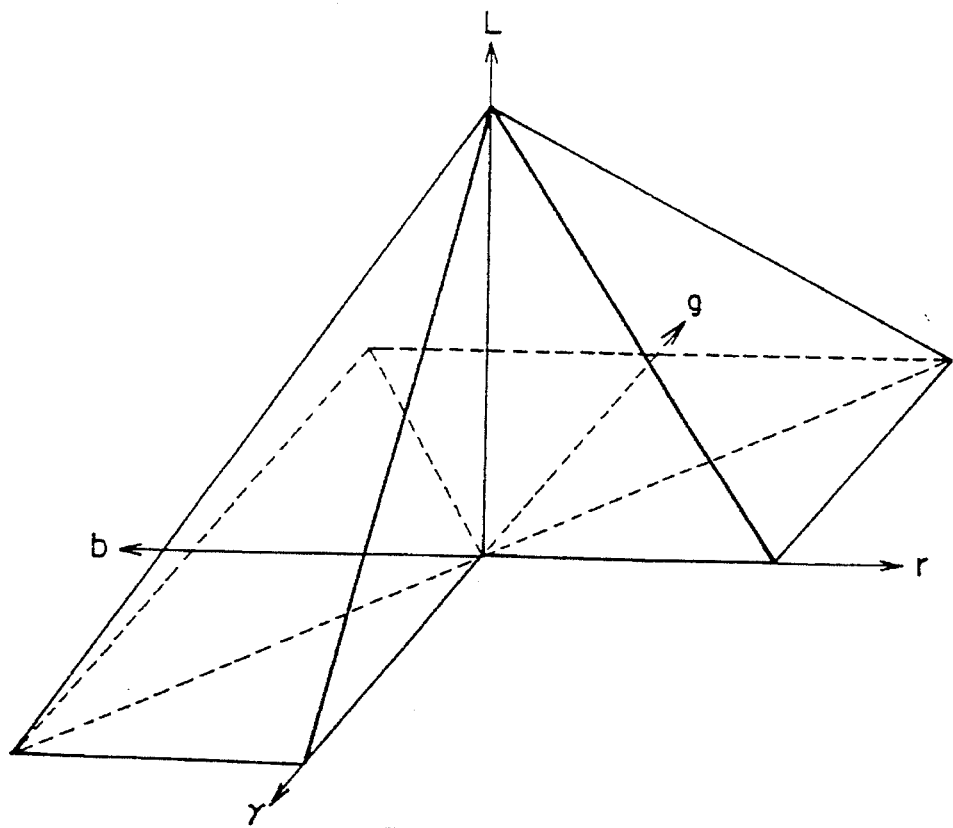
FIG. 2 is a diagram for explaining LXY space in which the minimum data L, and color difference data X and Y indicating differences between RGB signals and the minimum signal L are described.
Figure 3:
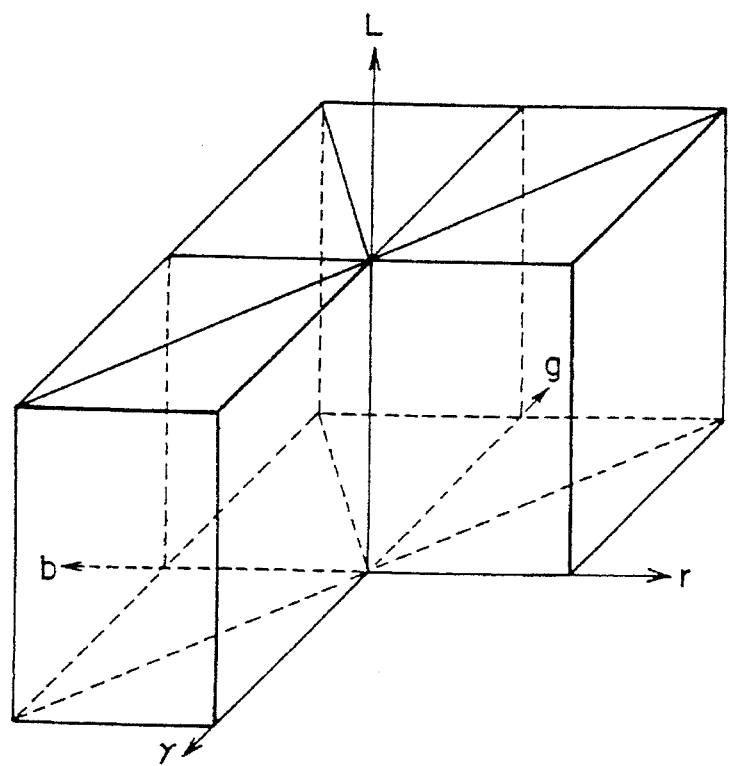
FIG. 3 is a diagram for explaining unit triangular prisms into which the LXY space shown in FIG. 2 is divided.

FIG. 2 shows the color space LXY in which the input RGB data is described by the minimum value L and the difference data (X, Y). In the space LXY of FIG. 2, r=R–L, g=G–L, b=B–L. The color space LXY shown in FIG. 2 is divided into a number of unit triangular prisms as shown in FIG. 3. The output image data is produced by performing interpolation of data corresponding to four lattice points of one unit triangular prism on the color space LXY. In the color space shown in FIG. 3, r=R–L, g=G–L, b=B–L.

From the values of the input RGB data (R, G, B), the selecting signal S, the minimum value L and the difference data (X, Y) are determined as follows.

Figure 4:
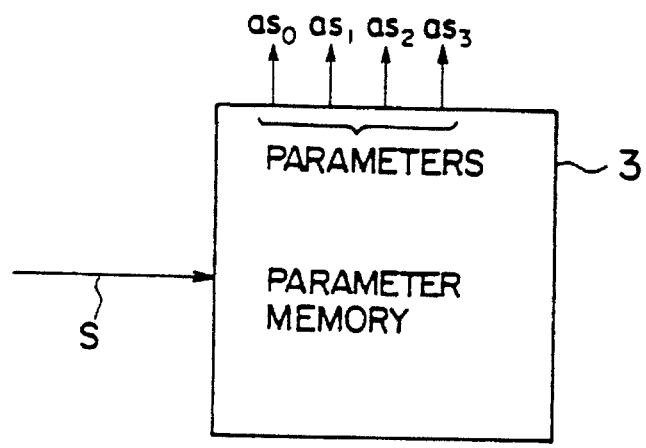
FIG. 4 is a diagram showing a parameter memory of the color correction apparatus shown in FIG. 1.

IF $R \geq G$ and $G \geq B$,
$S = 0, L = B, X = R - L, Y = G - L$
IF $G > R$ and $R \geq B$,
$S = 1, L = B, X = G - L, Y = R - L$
IF $G \geq B$ and $B > R$,
$S = 2, L = R, X = G - L, Y = B - L$
IF $B > G$ and $G \geq R$,
$S = 3, L = R, X = B - L, Y = G - L$
IF $B > R$ and $R \geq G$,
$S = 4, L = G, X = B - L, Y = R - L$
IF $R \geq B$ and $B > G$,
$S = 5, L = G, X = R - L, Y = B - L$ In the parameter memory 3, sets of four predetermined parameters (as0, as1, as2, as3) for the color transformation are stored at the addresses corresponding to the selecting signal S of the preprocessor 2. The four parameters (asi, i=0 to 3) stored in the parameter memory 3 correspond to the lattice points of each unit triangular prism on the color space LXY, and the parameters asi are output from the parameter memory 3 to the matrix processor 5 in accordance with the selecting signal S from the preprocessor 2, as shown in FIG. 4.

The P1 processor 4 generates a signal of output data P1 (=R=G=B) when the input RGB data is achromatic data (R=G=B). At the P1 processor 4, no special color processing is performed, and the signal P1 of the minimum value L from the preprocessor 2 merely passes through. When it is necessary to perform a color modification (which will be described later), the P1 processor produces the signal P1=f(L) (which is a function of the minimum value L) through a prescribed table conversion process.

Figure 5:
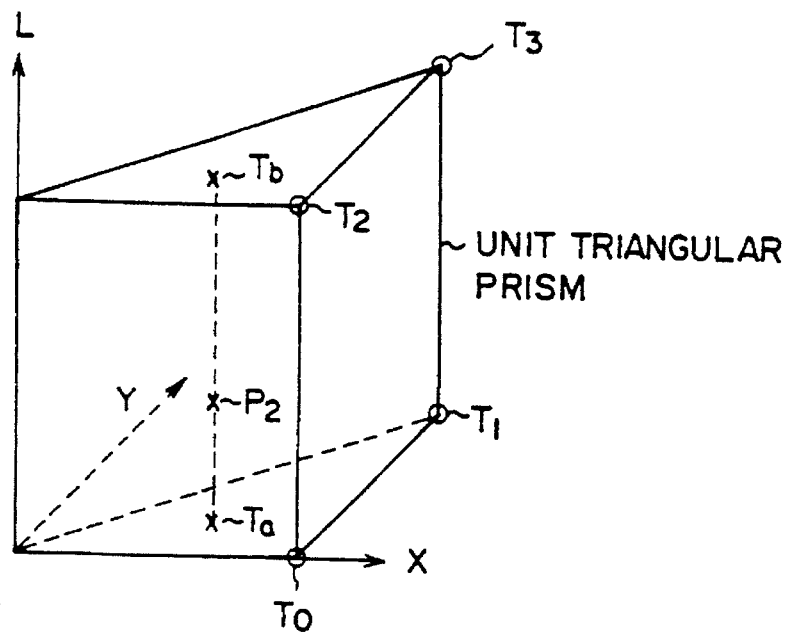
FIG. 5 is a diagram for explaining interpolation performed with a unit triangular prism.

In accordance with the minimum value L and difference data (X, Y) of the preprocessor 2 and in accordance with the parameters asi of the parameter memory 3, the matrix processor 5 produces the signal of the output data P2 through a prescribed interpolation performed using the unit triangular prisms on the color space LXY. FIG. 5 shows one unit triangular prism on the color space LXY. It is assumed that predetermined output data Ti (T0, T1, T2, T3) are assigned to four lattice points of the unit triangular prism, as shown in FIG. 5. The output data P2 of the matrix processor 5 at coordinates (L, X, Y) of the color space LXY is determined within the unit triangular prism through interpolation performed with the output data Ti as follows. Data corresponding to two lattice points of the unit triangular prism which points lie on the L-axis of the color space LXY (X=0, Y=0) are preset to zero. The input data (L, X, Y) are normalized to a range between 0 and 1.

Output data Ta, corresponding to coordinates (X, Y) on the bottom surface of the unit triangular prism shown in FIG. 5, is determined through a linear interpolation of the predetermined output data T0 and T1, as follows.

$Ta = T0\ X + T1\ Y$

Similarly, an output data Tb, corresponding to coordinates (X, Y) on the top surface of the unit triangular prism shown in FIG. 5, is determined through a linear interpolation of the two predetermined output data T2 and T3, as follows.

$Tb = T2\ X + T3\ Y$

Therefore, the output data P2 of the matrix processor 5 at coordinates (L, X, Y) within the unit triangular prism is determined as follows.

$$\begin{aligned}
P2 &= Ta + (TB - Ta)L & (1) \\
&= T0\ X + (T2 - T0)L\ X + & (2) \\
&\quad T1\ Y + (T3 - T1)L\ Y \\
&= X(T0 + (T2 - T0)L) + \\
&\quad Y(T1 + (T3 - T1)L) \\
&= X(as0 + as1\ L) + \\
&\quad Y(as2 + as3\ L)
\end{aligned}$$

Thus, at the matrix processor 5, the parameters asi (as0, as1, as2, as3) are read from the parameter memory 3 in accordance with the value of the selecting signal S, and the output data P2 of the matrix processor 5 corresponding to the coordinates (L, X, Y) within the unit triangular prism is determined in accordance with the formula (2).

The output data P1 of the P1 processor 4 and the output data P2 of the matrix processor 5 are added at the limiter 6 to produce a signal of output data P3 (=P1+P2). The limiter 6 performs a limiting process for the output data P3 as follows. When the output data P3, after the addition is performed, is higher than the highest intensity value 255, the data P3 is set to 255. When the output data P3 is lower than the lowest intensity value 0, the data P3 is set to 0. The output data P3 other than the cases varies linearly with the reflection factor.

IF $P1 + P2 > 255$,     $P3 = 255$
IF $P1 + P2 < 0$,       $P3 = 0$
ELSE                    $P3 = P1 + P2$

The output gamma corrector 7 produces a signal P indicating the output YMC data, by performing gamma correction for the output data P3 of the limiter 6. The output data P from the output gamma corrector 7 varies linearly with the reflection factor when the output image is printed.

In the above mentioned first embodiment, the description has been given of the conversion from the intensities of input RGB data of the scanner into the densities of output YMC colors for the printer. However, the present invention is applicable to the color transformation from the input RGB space of the scanner into a standard NTSC (The National Television System Committee) RGB color space or a standard CIE (The Commission International de L'Eclairage) RGB color space. The present invention is also applicable to the color transformation from the NTSC RGB color space (or the NTSC YIQ color space, or the CIE RGB space) to the output YMC color space.

Figure 6:
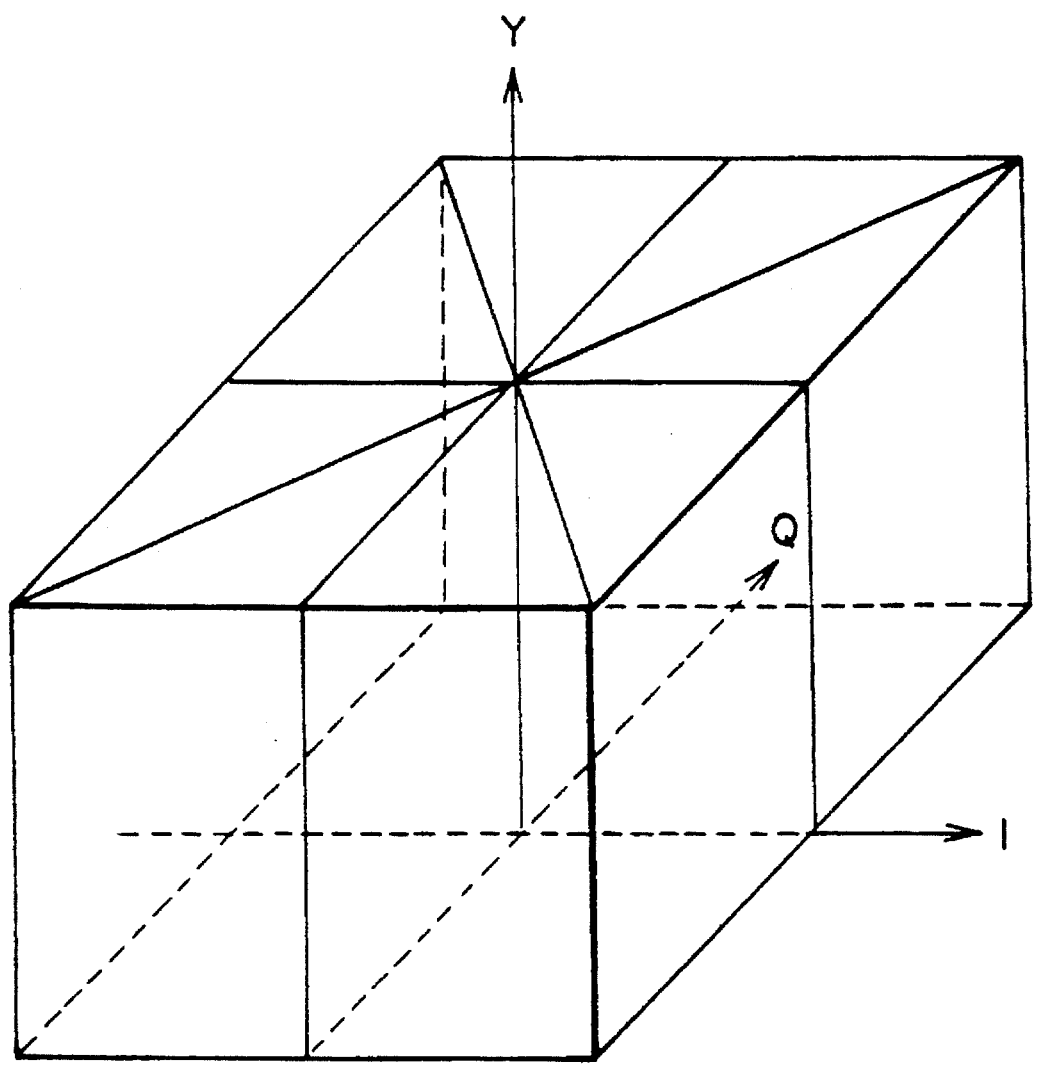
FIG. 6 is a diagram for explaining the division of input YIQ color space into a number of unit triangular prisms for the output YMC color space.

FIG. 6 shows division of input YIQ color space (NTSC) into a number of unit triangular prisms for the output YMC color space. In this example shown in FIG. 6, the input colors are already separated into the achromatic component and the color component. A color separation process such as that described above is no longer needed in the color correction apparatus.

In the first embodiment described above, the color correction apparatus can independently manipulate lightness, chromaticity and hue at the same time as it performs the color transformation to produce the densities of the output YMC colors from the intensities of the input RGB data. This function of the color correction apparatus is called a color modification. The color modification includes color modification of hue (for example, yellow being transformed into blue), color modification of chromaticity, and color modification of lightness for adjusting input and output gamutes of the image densities. When the color modification is performed, it is desirable that lightness, chromaticity and hue are independently controlled by the color correction apparatus. In the first embodiment of the present invention, it is possible to perform the color modification because the input colors are separated into color components and achromatic components before the color transformation is performed.

Figure 7A:
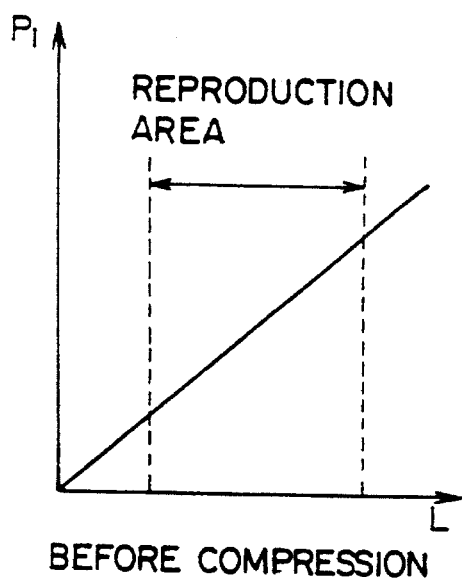
FIGS. 7A and 7B are diagrams for explaining the color modification of lightness.
Figure 7B:
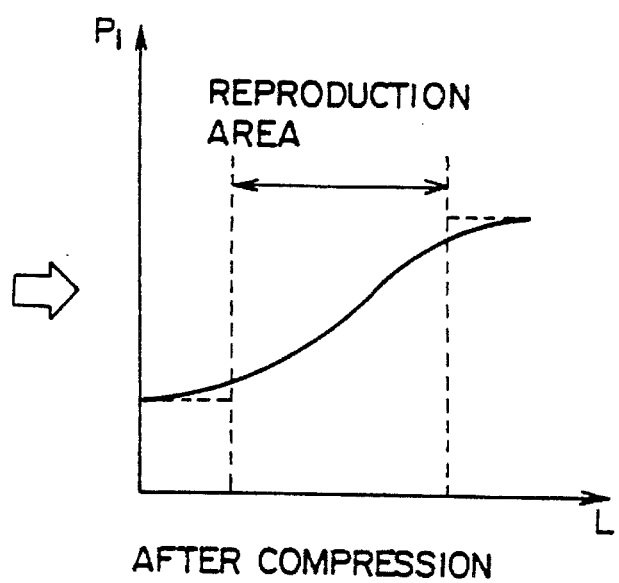

The color modification of lightness is performed by the P1 processor 4 of the color correction apparatus according to the present invention. The P1 processor 4 produces a signal indicating output data P1=f(L) through a prescribed table conversion process, and this signal produced by the P1 processor 4 is a function of the minimum value L from among the input RGB data (R, G, B). FIGS. 7A and 7B show the color modification of lightness being performed according to the present invention. FIG. 7A shows reproduction characteristic of the lightness modification before highlight/shadow areas of an input image are compressed, and FIG. 7B shows reproduction characteristic of lightness after the highlight/shadow areas are compressed.

Figure 8:
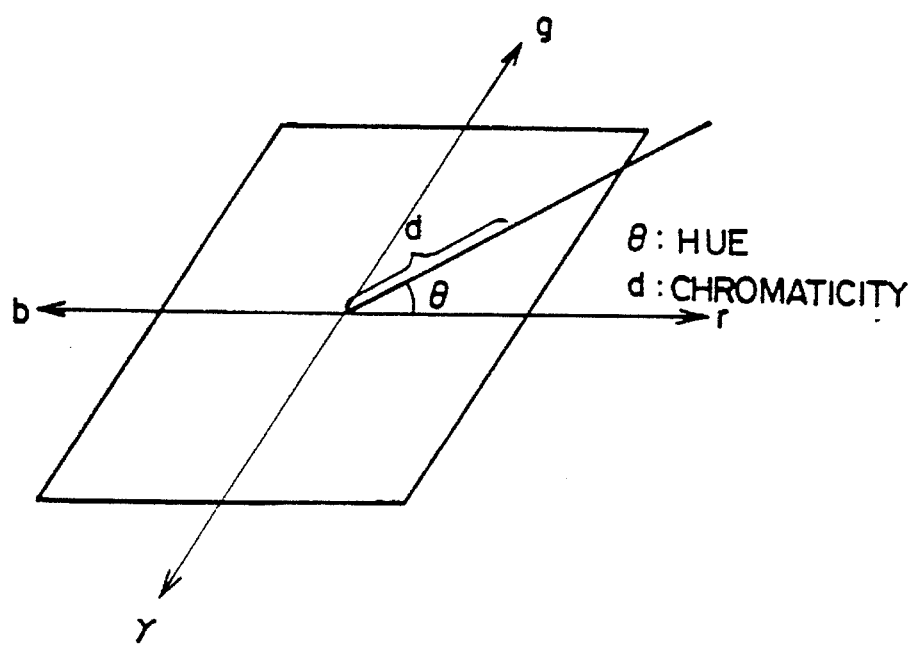
FIG. 8 is a diagram for explaining the color modifications of hue and chromaticity.

Generally, it is assumed that the hue of the input RGB data corresponds to the angle "θ" on the RGB color space and the chromaticity of the input RGB data corresponds to the distance "d" from the origin of the RGB color space, as shown in FIG. 8. The color modifications of hue and chromaticity are performed by changing values of the predetermined parameters (asi) of the parameter memory 3 and values of the predetermined output data assigned to the lattice points of each unit triangular prism on the color space. Thus, the color modifications of hue and chromaticity can be performed for high accuracy of color reproduction at the same time as the color transformation is performed.

Next, a description will be given of a second embodiment of the color correction apparatus according to the present invention. For the sake of convenience, a linear transformation of a color image from the input RGB data (R, G, B) into the output YMC colors P applied to the color correction will be considered. The output YMC colors P (Y, M, C) are determined by the following formula (3).

$$P = a1\ R + a2\ G + a3\ B \quad (3)$$

For example, when the input B data is the minimum value K, and when the input RGB data is: R=r+K, G=g+K, and B=K, the output YMC colors P are determined according to the formula (3), as follows.

$$\begin{aligned} P &= a1(r+K) + a2(g+K) + a3\ K \quad (4)\\ &= a1\ r + a2\ g + (a1+a2+a3)K\\ &= Pa(r,g) + Pc(K) \end{aligned}$$

where Pa(r, g)=a1 r+a2 g, Pc(K)=(a1+a2+a3) K

It should be noted from the formula (4) that a difference data (P–Pc) indicating a difference between the output YMC colors P and the data Pc of the minimum value K, varies linearly with the output data Pa(r, g). Formulas, similar to the formula (4) above, for determining the output YMC colors P can be considered in a case where the input R data is the minimum value K, and in a case where the input G data is the minimum value K. The above described principle is used as a basic model for constructing the second embodiment of the color correction apparatus according to the present invention.

In the second embodiment of the present invention, two types of color correction apparatuses in which prescribed interpolation processes are applied to the above basic model are proposed in order to eliminate the nonlinearity.

The first type of the color correction apparatus according to the present invention will now be described. In the first type of the color correction apparatus, the output data Pa, as the color component data, is produced through linear interpolation performed using the predetermined data assigned to lattice points of each triangular area selected on one two-dimensional color space. The output data Pc, as the achromatic component data, is produced through tangent approximation of the minimum value K from among the input RGB data.

As described above, it is assumed that color difference signals r, g, and b respectively indicate a difference between the input R data and the minimum value L, a difference between the input G data and the minimum value L, and a difference between the input B data and the minimum value L.

Figure 10:
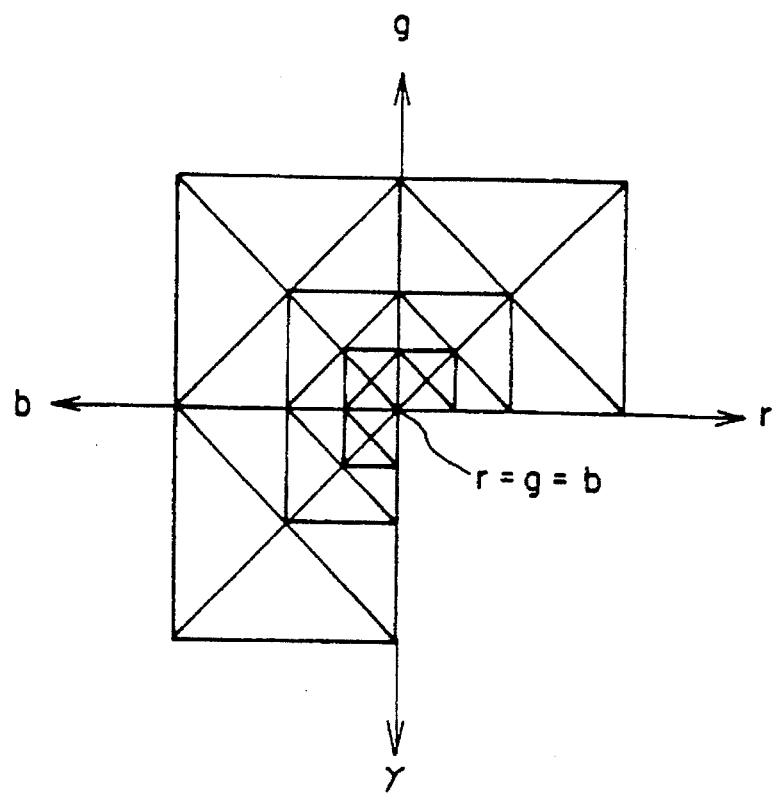
FIG. 10 is a diagram for explaining division of three two-dimensional planes of color space.

In order to enable simple construction of the hardware, a two-dimensional color plane in which the two color difference signals are described is divided into a number of triangular areas, and linear interpolation is performed in one of the triangular areas. In the second embodiment, only two multipliers are used to produce the output data Pa as described below. FIG. 10 shows division of each of the three two-dimensional planes (r–g, r–b, b–r) into a number of small triangular areas. When a relative position of the color differences (r, g, b) in one triangular area is represented as (dr, dg, db), the output data Pa, as the color component data, is determined as follows.

$$Pa = a1\ dr + a2\ dg + a3 \text{ on the } r\text{--}g \text{ plane}$$

$$Pa = a4\ dg + a5\ db + a6 \text{ on the } g\text{--}b \text{ plane}$$

$$Pa = a7\ db + a8\ dr + a9 \text{ on the } b\text{--}r \text{ plane}$$

where the coefficients ai (i=1 to 9) of one triangular area are predetermined such that they are different from those of other triangular areas, but the values of the output data Pa corresponding to the coefficients at boundaries between two adjacent triangular areas are continuous.

Figure 11:
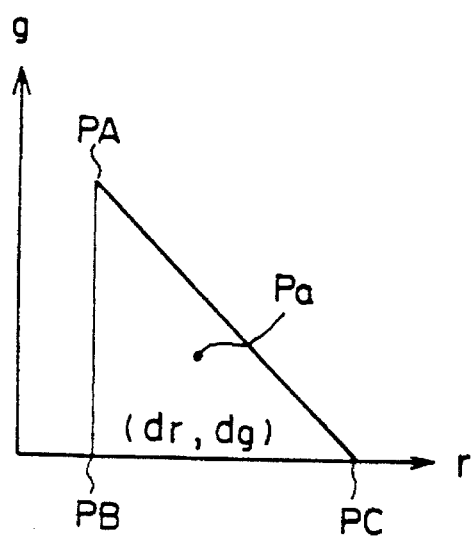
FIG. 11 is a diagram for explaining computation of output data through interpolation performed in one triangular area of the color space.

For example, when the predetermined data of the lattice points of one triangular area in the r–g two-dimensional color space are represented as PA, PB and PC, and the relative position of the color difference data in this triangular area is represented as (dr, dg), as shown in FIG. 11, the output data Pa is determined as follows.

$$Pa = (PC-PB)\ dr + (PA-PB)\ dg + PB$$

where a1=(PC–PB), a2=(PA–PB), a3=PB

Figure 12:
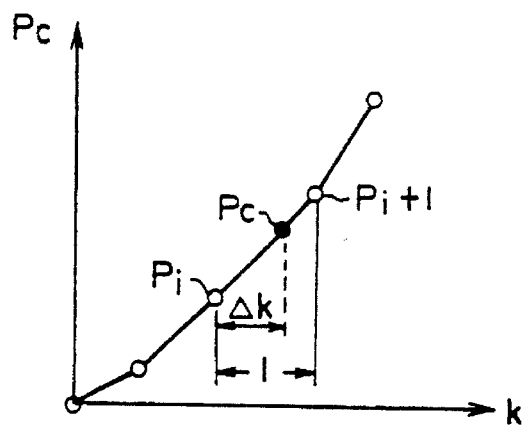
FIG. 12 is a diagram for explaining tangent interpolation being performed with respect to the minimum value k to determine the value of output data.

The output data Pc, as the achromatic component data, is determined in accordance with the minimum value K among the input RGB data. FIG. 12 shows tangent approximation through which the output data Pc is computed. This tangent approximation is performed with respect to the minimum value K from among the input RGB data. In the second embodiment, one multiplier is used to compute the output data Pc through the tangent approximation.

$$Pc = [P(i+1) - Pi]\ dK + Pi$$

The output data Pc is produced when the input RGB data is R=G=B, and the value of the output data Pc is used to control the characteristic of reproduction of colors in the black-and-white areas.

By adding the output data Pa and Pc, the output YMC color data P in accordance with the input RGB color data is generated as follows.

$$P = Pa + Pc \text{ [First Type]}$$

In the meantime, the second type of the color correction apparatus will be now described. The output color data P, in the second type, is determined according to a nonlinear quadratic equation of general form given below. According to the general form equation, output color data P is produced by adding a correction data Pb to the above mentioned output color data P (=Pa+Pc) of the first type, and therefore the output color data P is equal to (Pa+Pb+Pc). In the second type of the color correction apparatus, the reproduction of a color image with higher accuracy is accomplished due to the addition of the correction data Pb.

$$P = a1\ R + a2\ G + a3\ B + a4\ R^2 + a5\ G^2 + a6\ B^2 + a7\ R\ G + a8\ G\ B + a9\ B\ R \quad (5)$$

For example, when the input B data is the minimum value K, and R=r+K, G=g+K, and B=K are substituted into the above formula (5), $$\begin{aligned}
P &= a1\ r + a2\ g + a4\ r^2 + a5\ g^2 + a7\ rg + \\
&\quad (2a4 + a7 + a9)Kr + (2a5 + a7 + a8)Kg + \\
&\quad (a1 + a2 + a3)K + (a4 + a5 + a6 + a7 + \\
&\quad a8 + a9)\ K^2 \\
&= Pa(r, g) + Pb(Kr, Kg) + Pc(K)
\end{aligned} \quad (6)$$

where Pa=a1 r+a2 g+a4 $r^2$+a5 $g^2$+a7 rg. Pb=(2a4+a7+a9) Kr+(2a5+a7+a8) Kg, and Pc=(a1+a2+a3) K+(a4+a5+a6+a7+a8+a9) $K^2$.

In the above described second type, the output data Pa, as the color component data, is determined through the linear interpolation in a manner similar to that of the first type. The output data Pb, as the correction data, is determined from the sum of products of the minimum value K and the difference signals. For example, If the input B data is the minimum value K, the output data Pb is computed from the sum of c1 K r and c2 K g.

If the input R data is the minimum value K, the output data Pb is computed from the sum of c2 K b and c3 K g.

If the input G data is the minimum value K, the output data Pb is computed from the sum of c3 K r and c1 K r.

The output data Pc, as the achromatic component data, is produced in accordance with the minimum value K from among the input RGB data, in a manner similar to that of the first type. Thus, the output data P is determined by adding the computed Pa, Pb and Pc.

$$P = Pa + Pb + Pc \quad \text{[Second Type]}$$

The nonlinearity of the data Pa is reproduced by performing the interpolation on one of the r–b, g–r and r–b planes, the nonlinearity of the data Pc is reproduced by performing the tangent approximation, and the nonlinearity of the data Pb is reproduced by computing the sum of products of the minimum value K and the difference signals.

Figure 9:
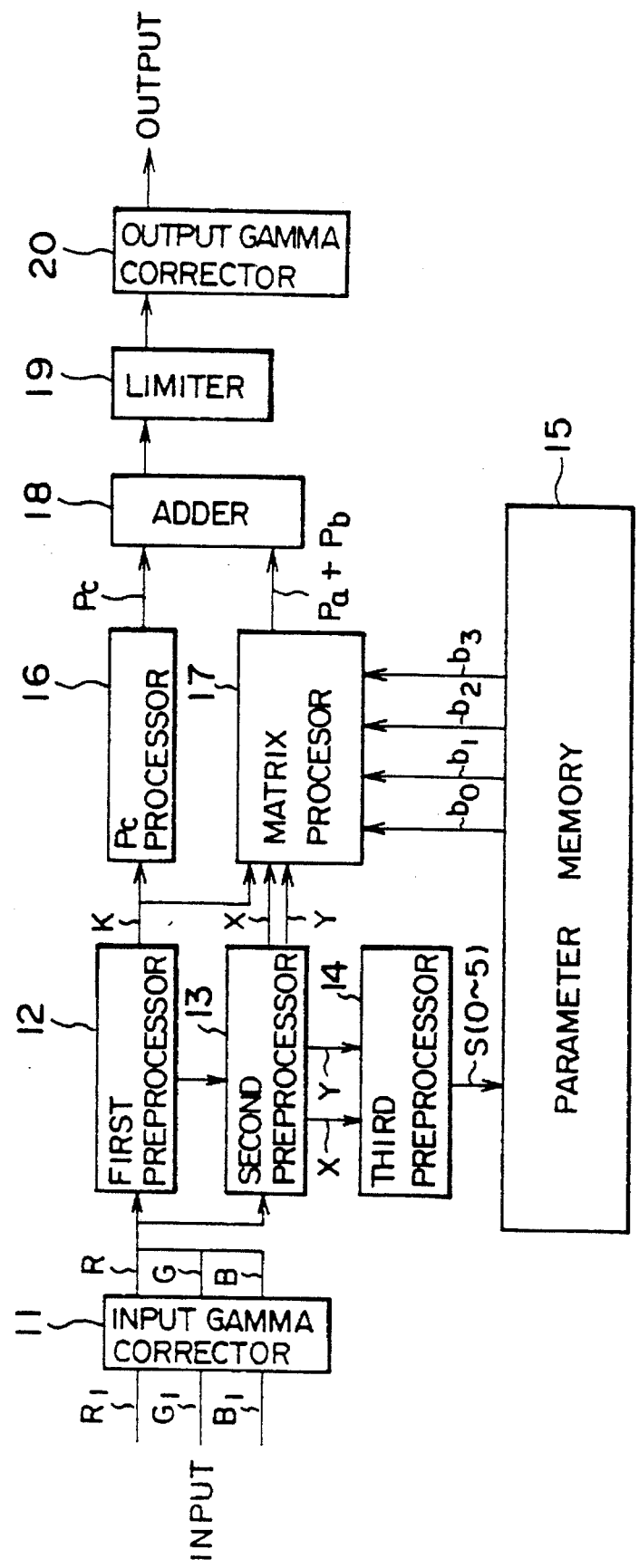
FIG. 9 is a block diagram showing a second embodiment of the color correction apparatus according to the present invention.

FIG. 9 shows the second embodiment of the color correction apparatus according to the present invention. In the apparatus shown in FIG. 9, there are provided an input gamma corrector 11, a first preprocessor 12, a second preprocessor 13, a third preprocessor 14, and a parameter memory 15. The input gamma corrector 11 performs gamma correction for eliminating the nonlinearity of image data (R1, G1, B1) of a color scanner, so as to produce RGB data (R, G, B) as inputs to the first and second preprocessors 12 and 13.

The first preprocessor 12 generates a signal of the minimum value K by comparing the values of the RGB data (R, G, B). The second preprocessor 13 generates signals of difference data (X, Y) indicating differences between the minimum value K and the values of the input RGB data. The third preprocessor 14 generates a selecting signal S (=0 to 5) used to select one of triangular areas of a two-dimensional color space in accordance with the difference data (X, Y) of the second preprocessor 13. The selecting signal S of the third preprocessor 14 is supplied to the parameter memory 15 as address input.

In the parameter memory 15, sets of predetermined parameters (bi, i=0 to 3), which correspond to data for the color transformation assigned to lattice points of each triangular area of the color space, are stored at addresses one of which is indicated by the selecting signal S from the third preprocessor 14.

In the color correction apparatus shown in FIG. 9, there are further provided a Pc processor 16, a matrix processor 17, an adder 18, a limiter 19, and an output gamma corrector 20.

In accordance with the minimum value K from the first preprocessor 12, the Pc processor 16 generates a signal of output data Pc, as the achromatic component data, by performing a prescribed tangent approximation. Since a set of predetermined parameters (bi, i=0 to 3) of the parameter memory 15 at the address indicated by the selecting signal S is supplied to the matrix processor 17, the matrix processor 17 generates a signal of output data Pa+Pb in accordance with the minimum value K and the difference data X and Y. The output data Pa+Pb as the color component data is computed through a prescribed linear interpolation in one triangular area of the two-dimensional color space. This linear interpolation is performed by computing [X (b0+b1 K)+Y (b2+b3 K)] in accordance with the minimum value K of the first preprocessor 12, the difference data X and Y of the second preprocessor 13, and the parameters bi (i=0 to 3) of the parameter memory 15.

The adder 18 adds the output data Pc of the Pc processor 16 and the output data Pa+Pb of the matrix processor 17 so as to produce a signal of output data P (=Pa+Pb+Pc). The limiter 18 performs a limiting process for the output data P of the adder 18. The output gamma corrector 20 produces a signal indicating the output YMC data, by performing gamma correction for the signal of the limiter 19 so as to eliminate the nonlinearity.

The output signal of the output gamma corrector 20 is supplied to a dither circuit, so that a dither process for the output signal is performed for gradation rendering of the output image. The signal from the dither circuit is supplied to a color printer so that the quantity of ink of each of yellow, magenta and cyan colors used by the color printer is controlled in an appropriate manner.

Figure 13:
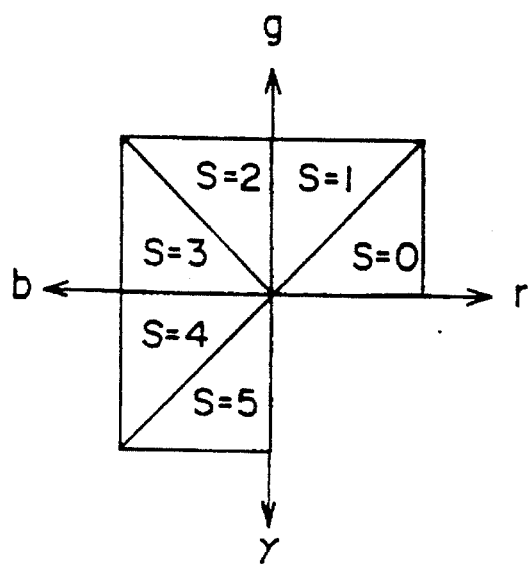
FIG. 13 is a diagram for explaining division of one two-dimensional color space into six triangular areas.

Next, a detailed description will be given of the second embodiment of the color correction apparatus according to the present invention. FIG. 13 shows division of one two-dimensional plane of the RGB color space into six triangular areas. According to the present invention, one of the six triangular areas is selected in accordance with the values of the input RGB data (R, G, B). The third preprocessor 14 produces the selecting signal S in accordance with the difference data X and Y of the second preprocessor 13. The selecting signal S is produced by the third preprocessor 14 as follows.

IF $R \geq G$ and $G \geq B$,
$S = 0, K = B, X = R - B, Y = G - B$
IF $G > R$ and $R \geq B$,
$S = 1, K = B, X = G - B, Y = R - B$
IF $G \geq B$ and $B > R$,
$S = 2, K = R, X = G - R, Y = B - R$ -continued IF $B > G$ and $G \geq R$,
$S = 3, K = R, X = B - R, Y = G - R$
IF $B > R$ and $R \geq G$,
$S = 4, K = G, X = B - G, Y = R - G$
IF $R \geq B$ and $B > G$,
$S = 5, K = G, X = R - G, Y = B - G$ The matrix processor 17 computes the output data Pa in accordance with the minimum value K of the first preprocessor 12, the difference data X and Y of the second preprocessor 13, and the parameters bi of the parameter memory 15.

Figure 15:
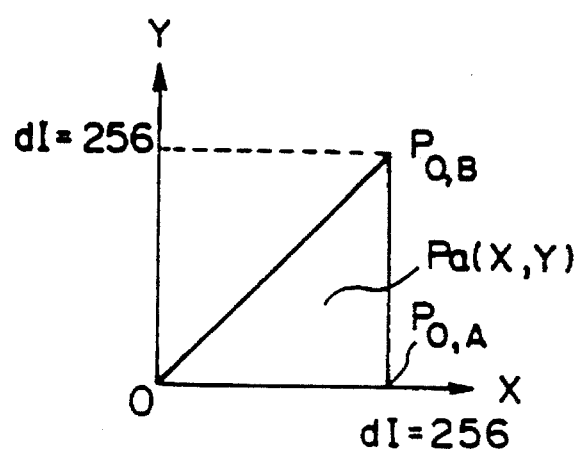
FIG. 15 is a diagram for explaining computation of output data through interpolation in one triangular area as shown in FIG. 13.

For example, when one triangular area of the color space is selected in accordance with the selecting signal S=0, and the predetermined data of lattice points of the triangular area corresponding to dI=256 are: P(0, A) and P(0, B) as shown in FIG. 15, the output data Pa is determined as follows.

$$Pa = P(0, A) X/dI + P(0, B) Y/dI$$

Since the computation of 1/dI is accomplished by a shifting operation, the computation of the output data Pa according to the above formula can be accomplished with same adders and two multipliers only. In the parameter memory 15, the values of P(0, A)/dI and P(0, B)/dI are stored as the parameters bi.

The Pc processor 16 computes the output data Pc through the tangent approximation in accordance with the minimum value K, as shown in FIG. 12. In FIG. 12, a set of segments (not shown) lies along the L-axis of the two-dimensional color space. A segment number m, and a relative displacement dK within one segment indicated by the segment number m are determined in accordance with the minimum value K as follows.

$dK = \text{mod }(K/d)$   [high-order bits of $K$]
$m = [K/d]$   [low-order bits of $K$]

where "d" is the number of segments preceding the target segment, "mod ( )" is a function of determining a remainder, and [ ] is the Gaussian sign.

Then, a predetermined output color data Pm corresponding to the start of the segment and a predetermined output color data Pm+1 corresponding to the end of the segment are read out by using the segment number m as address input. The Pc processor 16 computes the output data Pc through interpolation as follows.

$$Pc = (Pm+1-Pm) \, dK/dI + Pm$$

Since the computation of 1/dI is accomplished by a shifting operation, the computation of the output data Pc according to the above formula can be accomplished by using one multiplier. The computation of the output data Pc can be accomplished by using a table conversion process.

The adder 18 adds the output data Pc of the Pc processor 16 and the output data Pa of the matrix processor 17 to produce a signal of output data P (=Pa+Pc).

Figure 14:
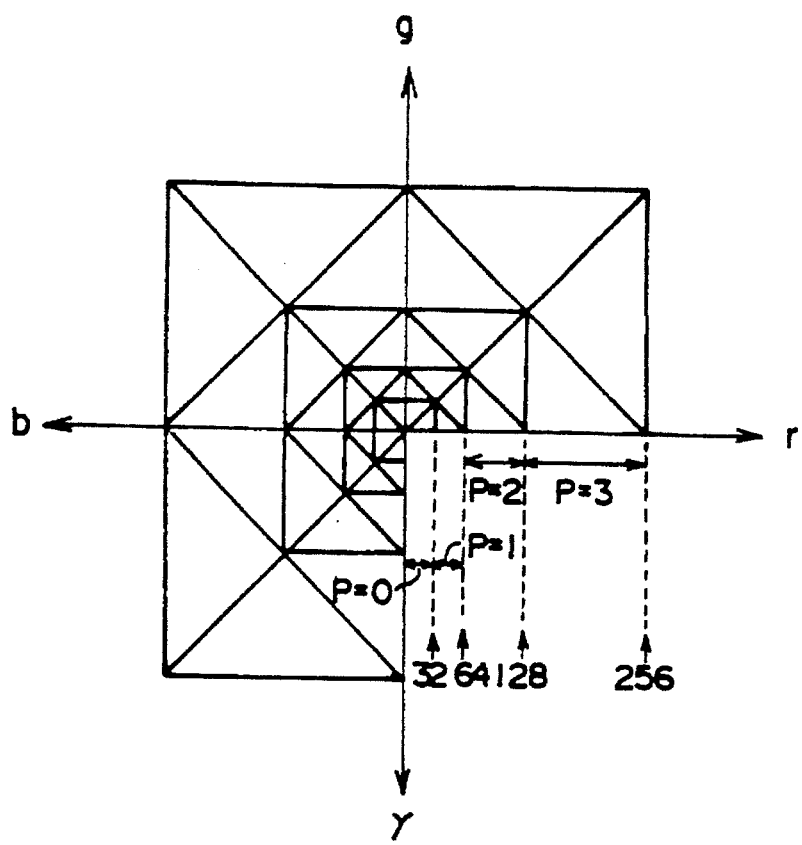
FIG. 14 is a diagram for explaining additional division of the two-dimensional color space into small triangular areas.

In the case of the second embodiment, an additional division method for dividing one two-dimensional color space can be used. FIG. 14 shows such division of a two-dimensional color space of the RGB color space into small triangular areas.

In the above mentioned case shown in FIG. 14, one of the six triangular areas shown in FIG. 13 is selected in accordance with the values of the input RGB data (R, G, B). The third preprocessor 14 produces the selecting signal S in accordance with the difference data X and Y of the second preprocessor 13. The selecting signal S is determined by the third preprocessor 14 in the same manner as described above.

The matrix processor 17 computes the output data Pa in accordance with the minimum value K of the first preprocessor 12, the difference data X and Y of the second preprocessor 13, and the parameters bi of the parameter memory 15.

For example, when one triangular area of the color space is selected in accordance with the selecting signal, and relative coordinates (dx, dy) of the input RGB data in the selected triangular area are represented as (dx, dy), an index p of the input RGB data used to select one of smaller segments of the triangular area shown in FIG. 14 is determined as follows.

$p = 0$   when $0 \leq X < 32$
$p = 1$   when $32 \leq X < 64$
$p = 2$   when $64 \leq X < 128$
$p = 3$   when $128 \leq X < 256$ The value of the index p can be discriminated by the matrix processor 7 by performing a logical operation of high-order bits of X.

Therefore, a relative position dX of the input RGB data in the selected segment is represented according to a formula: $dX = X - Xp$ (p=0 to 3, X0=0, X1=32, X2=64, X3=128). The value of the relative position dX can be determined by performing a masking operation. Also, a relative position dY of the input RGB data in the segment is represented as $dY = Y$.

Figure 16A:
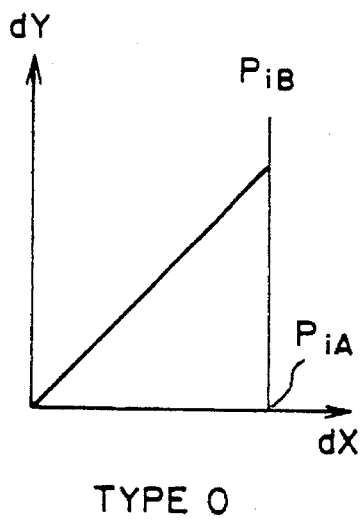
FIGS. 16A through 16C are diagrams for explaining computation of output data through interpolation in one small triangular area as shown in FIG. 14.
Figure 16B:
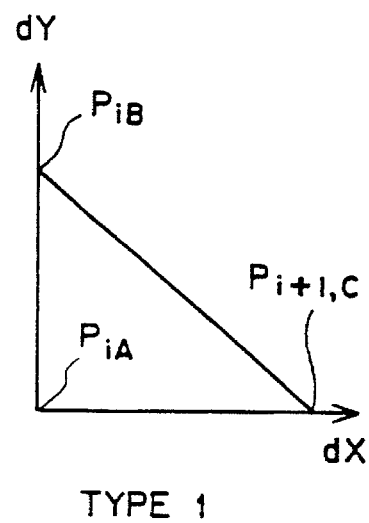
Figure 16C:
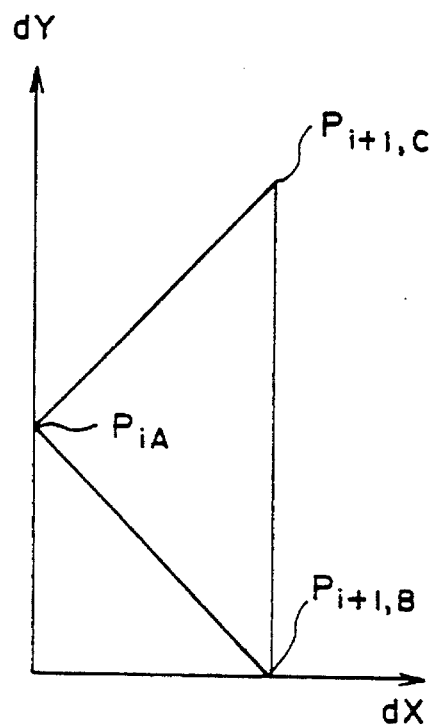

FIGS. 16A through 16C show three types of small triangular segments in which the output data is computed. One of the three types of the small segments is selected by the matrix processor 17 as follows.

If the value of p is equal to 0, one small triangular segment of Type 0, as shown in FIG. 16A, is selected in the selected triangular area.

If the value of p is not equal to 0 and the value of dY is equal to or smaller than −dX+dIp, one small triangular segment of Type 1, as shown in FIG. 16B, is selected.

If the value of p is not equal to 0 and the value of dY is greater than −dX+dIp, one small triangular segment of Type 2, as shown in FIG. 16C, is selected.

In the example shown in FIG. 14, the value of dIp is predetermined as: dI0=32, dI1=64, dI2=128, dI3=256. The selection of the type of small triangular segment can be performed by using a comparator provided in the matrix processor 17.

In accordance with the relative coordinates and the type of small triangular segment, the matrix processor 17 computes the output data Pa as follows:

If a small triangle of Type 0 is selected and predetermined data of output color assigned to lattice points of the small triangle are PiA and PiB, $$Pa = PiA \, dX/dIp + PiB \, dY/dIp.$$

If a small triangle of Type 1 is selected and predetermined data of output color assigned to lattice points of the small triangle are PiA, PiB and Pi+1,C, $$Pa = (Pi+1,C-PiA) \, dX/dIp + (PiB-PiA) \, dY/dIp + PiA.$$

If a small triangle of Type 2 is selected and predetermined data of output color assigned to lattice points of the small triangle are PiA, Pi+1,B, Pi+1,C, $$Pa = (Pi+1,B + Pi+1,C - 2PiA)dX/2dIp +$$
$$(Pi+1,C - Pi+1,B)dY/2dIp +$$
$$(2PiA + Pi+1,B - Pi+1,C)/2.$$

Since the computation of /dIp is accomplished by a shifting operation, the computation of the output data Pa according to the above formulas can be accomplished by using two multipliers.

According to the second type of the color correction apparatus, the output color data P is computed by adding the correction data Pb to the above mentioned output color data P (=Pa+Pc) of the first type, and the output color data P equal to (Pa+Pb+Pc) is generated by the adder 18. In the second type of the color correction apparatus, the output data Pa as the color component data is computed through linear interpolation in the same manner as described above in the first type. Also, the output data Pc as the achromatic component data is computed through tangent approximation in the same manner as described above in the first type.

The output data Pb, as the correction data, is computed by determining the sum of products of the minimum value K and the difference signals, as described above. For example, if the input B data is the minimum value K, the output data Pb is computed from the sum of products of c1 K r and c2 K g (c1, c2: coefficients in a general form). Therefore, in order to determine the value of the output data Pb, the values of coefficients cx (x=r, g, b) and cy (y=r, g, b) are selected by using a multiplexer provided in the matrix processor 17, in accordance with the values of the input RGB data, as follows.

IF $R \geq G$ and $G \geq B$,
    $cx = cr, cy = cg$.
    IF $G > R$ and $R \geq B$,
    $cx = cg, cy = cr$.
    IF $G \geq B$ and $B > R$,
    $cx = cg, cy = cb$.
    IF $B > G$ and $G \geq R$,
    $cx = cb, cy = cg$.
    IF $B > R$ and $R \geq G$,
    $cx = cb, cy = cr$.
    IF $R \geq B$ and $B > G$,
    $cx = cr, cy = cb$.

In accordance with the selected coefficient values, the matrix processor 17 computes the output data Pb as follows.

$$Pb = cx \, K \, X + cy \, K \, Y$$

Therefore, the computation of the output data Pb can be accomplished by an adder and a multiplier provided in the matrix processor 17.

Accordingly, in the case of the second type of the color correction apparatus, the output color data P represented as Pa+Pb+Pc is produced by the adder 18. By combining the computation of the output data Pa with the computation of the output data Pb, the sum of the output data Pa and Pb can be represented as [X (b0+b1 K)+Y (b2+b3 K)]. The computation of the sum of the output data Pa and Pb can be accomplished using four multipliers, the computation of the output data Pc can be accomplished using one multiplier, and therefore the output color data P can be computed by using a total of five multipliers.

In the second embodiment described above, the description has been given of the color transformation from the input RGB data of the scanner into the output YMC colors for the printer. However, the present invention is applicable to the color transformation from the RGB color space into the standard NTSC RGB color space or the standard CIE RGB color space. Also, the present invention is applicable to the color transformation from the NTSC RGB color space (or the NTSC YIQ color space, the CIE RGB space) to the output YMC color space.

In the second embodiment described above, the color correction apparatus can independently manipulate lightness, chromaticity and hue at the same time as it performs the color transformation to produce the output YMC colors from the values of the input RGB data. Also, in the second embodiment, it is possible to perform the color modification because the input colors are separated into color components and achromatic components and then the color transformation is performed.

Further, the present invention is not limited to the above described embodiments, and variations and modifications may be made without departing from the scope of the present invention.

What is claimed is:

1. A color signal transforming apparatus for transforming a set of color signals including an achromatic color signal L, a first color signal X and a second color signal Y into an output color signal O, the apparatus comprising:

a) means for outputting, in response to a selecting signal, a set of predetermined parameters corresponding to a unit triangular prism in a color space LXY; and b) means for using the set of predetermined parameters to generate the output color signal O by interpolating values of the achromatic color signal L, the first color signal X and the second color signal Y.

2. The apparatus of claim 1, wherein the outputting means includes:

a parameter memory for storing a plurality of sets of predetermined parameters assigned to respective unit triangular prisms in the color space LXY, which sets are read out from the parameter memory in response to the selecting signal.

3. A color signal transforming apparatus for transforming a set of color signals including an achromatic color signal L, a first color signal X and a second color signal Y into an output color signal O, the apparatus comprising:

a) first means for outputting, in response to a selecting signal, a set of predetermined parameters corresponding to a unit triangular prism in a color space LXY; and b) second means for generating a first output color signal from the achromatic color signal L;

c) third means for using the set of predetermined parameters to generate a second output color signal by interpolating values of the achromatic color signal L, the first color signal X and the second color signal Y; and d) fourth means for computing a sum of the first output color signal and the second output color signal to generate the output color signal O.

4. The apparatus of claim 3, wherein the first means includes:

a parameter memory for storing a plurality of sets of predetermined parameters assigned to respective unit triangular prisms in the color space LXY, which sets are read out from the parameter memory in response to the selecting signal.

5. A color signal transforming apparatus for transforming a set of color signals including an achromatic color signal L, a first color signal X and a second color signal Y into an output color signal O, the apparatus comprising:

a) first means for outputting, in response to a selecting signal, a set of predetermined parameters corresponding to a unit triangular prism in a color space LXY; and b) second means for generating a first output color signal from the achromatic color signal L in accordance with a predetermined function which governs a lightness of the output color signal O based on a lightness of input color signals;

c) third means for using the set of predetermined parameters to generate a second output color signal by interpolating values of the achromatic color signal L, the first color signal X and the second color signal Y, to vary a chromaticity and a hue of the output color signal O based on a chromaticity and a hue of the input color signals; and d) fourth means for computing a sum of the first output color signal and the second output color signal to generate the output color signal O.

* * * * *